(12) United States Patent
Akiyama (10) Patent No.: US 10,534,250 B2
(45) Date of Patent: Jan. 14, 2020

(54) ILLUMINATION DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/330,262

(22) PCT Filed: Aug. 23, 2017

(86) PCT No.: PCT/JP2017/030131
§ 371 (c)(1),
(2) Date: Mar. 4, 2019

(87) PCT Pub. No.: WO2018/043247
PCT Pub. Date: Mar. 8, 2018

(65) Prior Publication Data
US 2019/0196317 A1    Jun. 27, 2019

(30) Foreign Application Priority Data
Sep. 5, 2016  (JP) .................................. 2016-172993

(51) Int. Cl.
*G03B 21/20*  (2006.01)
*G02B 27/48*  (2006.01)
(Continued)

(52) U.S. Cl.
CPC .......... *G03B 21/208* (2013.01); *G02B 27/48* (2013.01); *G03B 21/2033* (2013.01);
(Continued)

(58) Field of Classification Search
CPC .. G03B 21/208; G03B 21/005; G03B 21/008; G03B 21/2033; G03B 21/31;
(Continued)

(56) References Cited

U.S. PATENT DOCUMENTS

2010/0165301 A1  7/2010  Kojima et al.
2011/0102748 A1  5/2011  Shevlin et al.
(Continued)

FOREIGN PATENT DOCUMENTS

JP  2010-152176 A  7/2010
JP  2011-507042 A  3/2011
(Continued)

OTHER PUBLICATIONS

Nov. 7, 2017 International Search Report issued in International Patent Application No. PCT/JP2017/030131.

*Primary Examiner* — William C. Dowling
(74) *Attorney, Agent, or Firm* — Oliff PLC (57) ABSTRACT

An illumination device includes a light source device, a first collimate optical system on which a light beam emitted from the light source device is made incident, a condensing optical system provided at a post-stage of the first collimate optical system, a rod provided at a post-stage of the condensing optical system, a second collimate optical system provided at a post-stage of the rod, a lens integrator provided at a post-stage of the second collimate optical system, and a superimposing lens provided at a post-stage of the lens integrator. The lens integrator includes a first lens array and a second lens array provided at a post-stage of the first lens array. A light-emitting end face of the rod and a lens surface of the second lens array are substantially conjugate with each other.

6 Claims, 9 Drawing Sheets

(51) Int. Cl.
*H04N 9/31* (2006.01)
*G03B 21/00* (2006.01)
*G03B 33/12* (2006.01)

(52) U.S. Cl.
CPC ......... *H04N 9/3152* (2013.01); *H04N 9/3161* (2013.01); *G03B 21/006* (2013.01); *G03B 33/12* (2013.01)

(58) Field of Classification Search
CPC ........ G02B 27/48; H04N 9/31; H04N 9/3102; H04N 9/3105; H04N 9/3152; H04N 9/3161
USPC .......................................................... 353/38
See application file for complete search history.

(56) References Cited

U.S. PATENT DOCUMENTS

2012/0092624 A1  4/2012  Oiwa et al.
2013/0010215 A1  1/2013  Taketsu et al.
2013/0083471 A1* 4/2013  Zhou ...................... G06F 1/187
                                                        361/679.31
2014/0232992 A1  8/2014  Egawa
2014/0247430 A1  9/2014  Inoue et al.
2016/0223887 A1  8/2016  Egawa et al.
2018/0149957 A1* 5/2018  Maeda ................. G02B 26/008
2018/0348616 A1* 12/2018 Hu ..................... G03B 21/2013
2019/0212640 A1* 7/2019  Yamakage ........... G02B 26/008

FOREIGN PATENT DOCUMENTS

| JP | 2014-163974 A | 9/2014 |
| JP | 2014-164175 A | 9/2014 |
| JP | 2014-170034 A | 9/2014 |
| JP | 2014-178693 A | 9/2014 |
| JP | 2015-64444 A  | 4/2015 |
| JP | 2015-230866 A | 12/2015 |
| JP | 2016-57644 A  | 4/2016 |

* cited by examiner

ILLUMINATION DEVICE AND PROJECTOR

BACKGROUND

1. Technical Field

The present invention relates to an illumination device and a projector.

2. Related Art

JP-T-2011-507042 discloses a technique for reducing speckle noise using a deformable mirror in a projector in which a laser light source is used.

JP-A-2015-64444 discloses that an EP value is introduced as an indicator of the size of speckles and the speckles can be reduced by increasing the EP value.

In the projector disclosed in JP-T-2011-507042, manufacturing and control of the operation of the deformable mirror are not easy. Therefore, there has been a demand for simple means that can increase the EP value disclosed in JP-A-2015-64444.

One aspect of the present invention has been devised in order to solve the problems described above, and one of objects thereof is to provide an illumination device with speckles reduced. One of objects of one aspect of the present invention is to provide a projector including the illumination device.

SUMMARY

According to a first aspect of the present invention, there is provided an illumination device including: a light source device; a first collimate optical system on which a light beam emitted from the light source device is made incident; a condensing optical system provided at a post-stage of the first collimate optical system; a rod provided at a post-stage of the condensing optical system; a second collimate optical system provided at a post-stage of the rod; a lens integrator provided at a post-stage of the second collimate optical system; and a superimposing lens provided at a post-stage of the lens integrator. The lens integrator includes a first lens array and a second lens array provided at a post-stage of the first lens array. A light-emitting end face of the rod and a lens surface of the second lens array are substantially conjugate with each other.

With the illumination device according to the first aspect, an image of the light-emitting end face of the rod can be formed on the lens surface of the second lens array. The image of the light-emitting end face functions as a secondary light source. Accordingly, it is possible to easily enlarge an image of the secondary light source formed on the second lens array compared with when light from the first collimate optical system is made incident on the lens integrator without using the rod. Consequently, it is possible to reduce speckles.

In the first aspect, it is preferable that the illumination device further includes a diffusing section provided on an optical path of the light beam between the condensing optical system and the light-emitting end face or on the light-emitting end face.

Since the illumination device includes the first lens array, a plurality of secondary light source images are formed on the second lens array. Since the illumination device includes the diffusing section, a region where the plurality of secondary light source images are formed is enlarged. Accordingly, it is possible to further reduce speckles.

In the first aspect, it is preferable that the diffusing section is provided between the condensing optical system and a light-incident end face of the rod and configured to be rotatable around a predetermined rotation axis.

With this configuration, since a diffusion state of light transmitted through the diffusing section temporally changes, a speckle pattern temporally changes. Since a time-averaged speckle pattern is recognized by an observer, speckle noise is less conspicuous than when the diffusing section does not rotate. Interference unevenness due to use of a laser light is reduced.

In the first aspect, it is preferable that the second lens array includes a plurality of second small lenses, and a shape of each of the plurality of second small lenses is similar to a shape of the light-emitting end face.

With this configuration, the secondary light source images can be expanded to a maximum size fit on the inner side of the contour of the second small lens. Accordingly, it is possible to reduce speckles by enlarging the secondary light source images.

According to a second aspect of the present invention, there is provided a projector including: the illumination device according to the first aspect; a light modulating device that modulates illumination light from the illumination device according to image information to thereby form image light; and a projection optical system that projects the image light.

The projector according to the second aspect includes the illumination device according to the first aspect. Therefore, the projector can display a high-quality image with speckle noise reduced.

In the second aspect, it is preferable that the first lens array includes a plurality of first small lenses, the light modulating device includes an image formation region, and a shape of each of the plurality of first small lenses is similar to a shape of the image formation region.

With this configuration, each of partial beams of light emitted from the first lens array can be efficiently made incident on the image formation region of the light modulating device. Accordingly, it is possible to realize high light use efficiency.

DESCRIPTION OF EXEMPLARY EMBODIMENTS

Embodiments of the present invention are explained in detail below with reference to the drawings.

Note that, in the drawings used in the following explanation, for convenience, characteristic portions are sometimes enlarged and shown in order to clearly show characteristics. Dimension ratios and the like of components are not always the same as actual dimension ratios and the like.

First Embodiment

Figure 1:
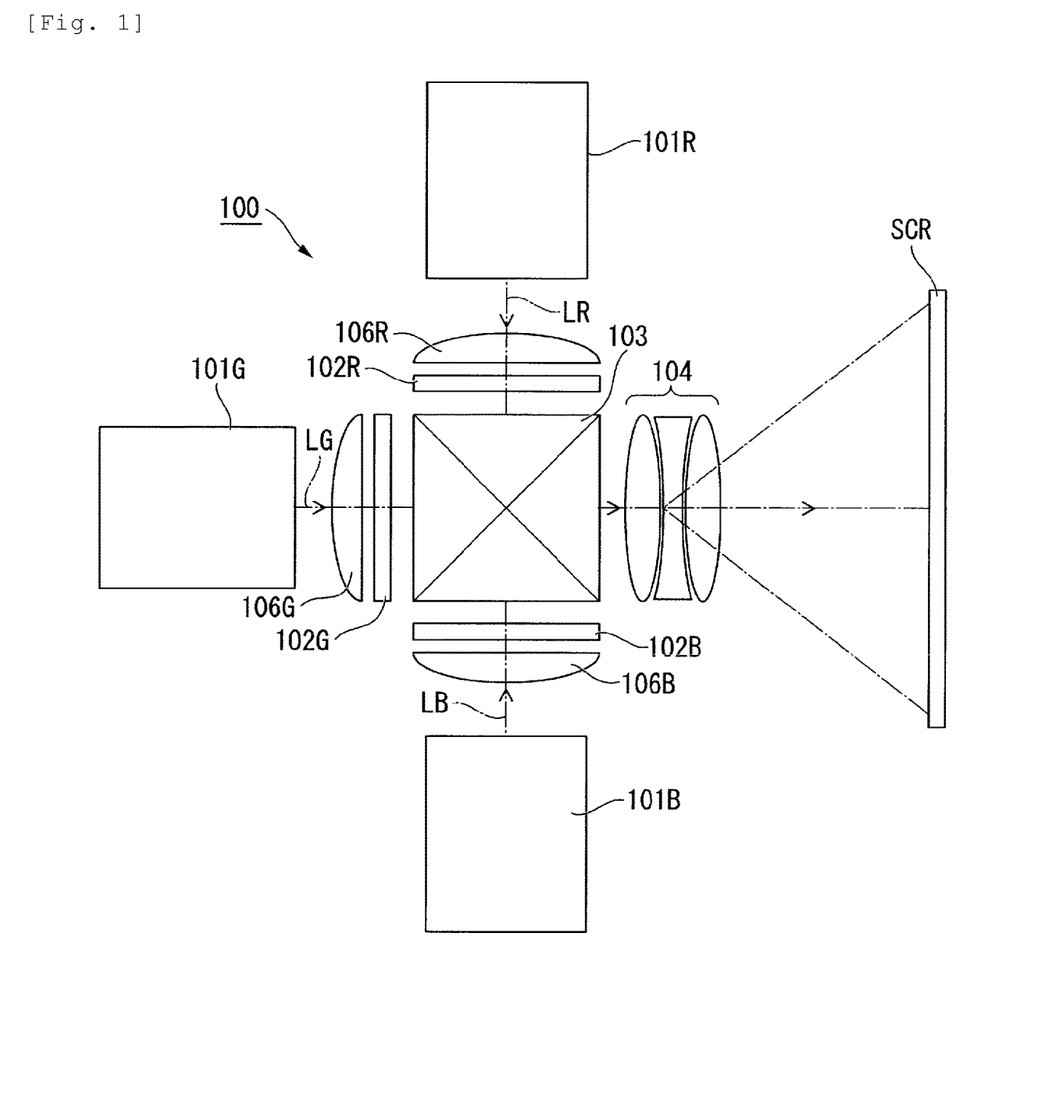
FIG. 1 is a schematic configuration diagram showing a projector in a first embodiment.

FIG. 1 is a schematic configuration diagram showing a projector in an embodiment.

As shown in FIG. 1, a projector 100 includes an illumination device for red light 101R, an illumination device for green light 101G, an illumination device for blue light 101B, a liquid-crystal light valve for red light 102R, a liquid-crystal light valve for green light 102G, a liquid-crystal light valve for blue light 102B, field lenses 106B, 106G, and 106R, a color synthesizing element 103, and a projection optical system 104.

In this embodiment, each of the illumination device for red light 101R, the illumination device for green light 101G, and the illumination device for blue light 101B corresponds to the "illumination device" in the claims. Each of the liquid-crystal light valve for red light 102R, the liquid-crystal light valve for green light 102G, and the liquid-crystal light valve for blue light 102B corresponds to the "light modulating device" in the claims.

The projector 100 operates as explained below in summary.

A bundle of rays LR formed by a red laser light emitted from the illumination device for red light 101R is made incident on the liquid-crystal light valve for red light 102R via the field lens 106R and modulated. Similarly, a bundle of rays LG formed by a green laser light emitted from the illumination device for green light 101G is made incident on the liquid-crystal light valve for green light 102G via the field lens 106G and modulated. A bundle of rays LB formed by a blue laser light emitted from the illumination device for blue light 101B is made incident on the liquid-crystal light valve for blue light 102B via the field lens 106B and modulated.

Although illustration is omitted, the liquid-crystal light valve for blue light 102B includes a liquid crystal panel in which a liquid crystal layer is sandwiched between a pair of glass substrates, a light-incident-side polarizing plate disposed on a light incident side of the liquid crystal panel, and a light-emission-side polarizing plate disposed on a light emission side of the liquid crystal panel. Operation modes of the liquid crystal panel are a TN mode, a VA mode, a lateral electric field mode, and the like and are not particularly limited. The liquid-crystal light valve for red light and the liquid-crystal light valve for blue light have the same configuration.

Red light modulated by the liquid-crystal light valve for red light 102R, green light modulated by the liquid-crystal light valve for green light 102G, and blue light modulated by the liquid-crystal light valve for blue light 102B are made incident on the color synthesizing element 103 and combined. The color synthesizing element 103 is configured by, for example, a cross dichroic prism. Light synthesized by the color synthesizing element 103 is emitted as image light and enlarged and projected on a screen SCR by the projection optical system 104. In this way, a full-color projection image is displayed.

The components of the projector 100 are explained below.

The illumination device for red light 101R, the illumination device for green light 101G, and the illumination device for blue light 101B are only different in colors of emitted lights and are the same in a device configuration. As an example, a laser light source for red light emits a laser light (a light beam) having a peak wavelength in a wavelength region of approximately 585 nm to 720 nm. A laser light source for green light emits a laser light (a light beam) having a peak wavelength in a wavelength region of approximately 495 nm to 585 nm. A laser light source for blue light emits a laser light (a light beam) having a peak wavelength in a wavelength region of approximately 380 nm to 495 nm.

Therefore, in the following explanation, only the illumination device for blue light 101B is explained. Explanation is omitted concerning the illumination device for red light 101R and the illumination device for green light 101G.

Figure 2:
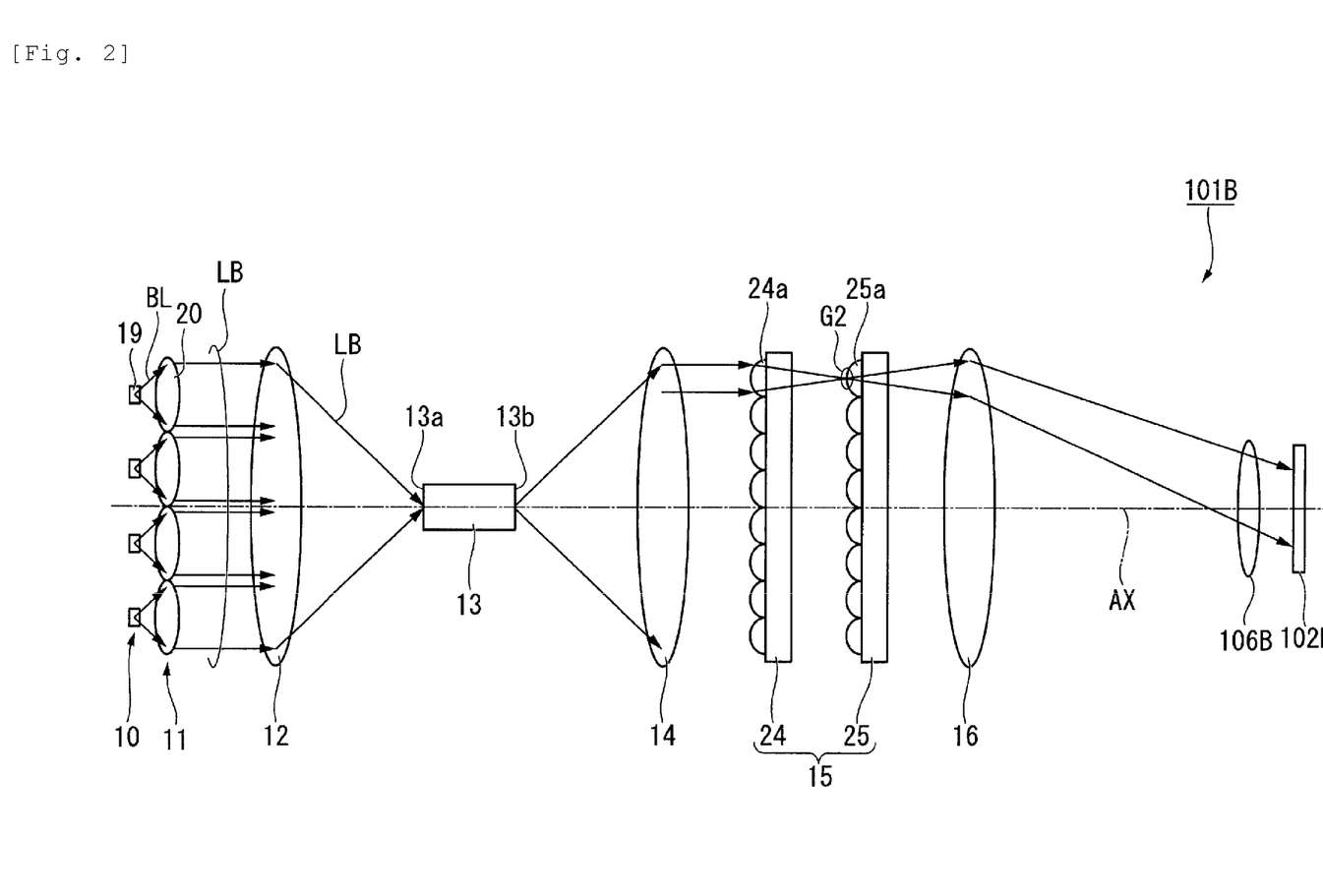
FIG. 2 is a diagram showing a schematic configuration of an illumination device for blue light according to the first embodiment.

FIG. 2 is a diagram showing a schematic configuration of the illumination device for blue light 101B. Note that, in FIG. 2, for convenience of explanation, the field lens 106B and the liquid-crystal light valve for blue light 102B are also illustrated.

As shown in FIG. 2, the illumination device for blue light 101B includes a light source device 10, a first collimate optical system 11, a condensing optical system 12 provided at a post-stage of the first collimate optical system 11, a rod 13 provided at a post-stage of the condensing optical system 12, a second collimate optical system 14 provided at a post-stage of the rod 13, a lens integrator 15 provided at a post-stage of the second collimate optical system 14, and a superimposing lens 16 provided at a post-stage of the lens integrator 15.

The light source device 10 includes laser light sources 19 that emit blue light beams BL. Note that the number of the laser light sources 19 is not limited. In this embodiment, a plurality of laser light sources 19 are two-dimensionally arrayed. In FIG. 2, only four laser light sources 19 are illustrated. However, the plurality of laser light sources 19 are arrayed in a matrix shape (e.g., four rows and four columns) in a plane perpendicular to an illumination optical axis AX. The light source device 10 emits the bundle of rays LB formed by a plurality of light beams BL.

The first collimate optical system 11 is provided on a light emission side of the light source device 10. The bundle of rays LB emitted from the light source device 10 is made incident on the first collimate optical system 11. The first collimate optical system 11 includes a plurality of collimate lenses 20 arrayed in an array shape. Each of the plurality of collimate lenses 20 is disposed to correspond to each of the plurality of laser light sources 19. That is, the plurality of collimate lenses 2 are arrayed in a matrix shape (e.g., four rows and four columns). The light beam BL emitted from each of the laser light sources 19 is substantially collimated by the collimate lens 20. The first collimate optical system 11 collimates the bundle of rays LB on the basis of such a configuration.

Note that, instead of the configuration of the first collimate optical system 11 explained above, a collimate optical system obtained by combining, for example, a plurality of cylindrical lenses arrayed in a row direction and a plurality of cylindrical lenses arrayed in a column direction may be used.

The bundle of rays LB transmitted through the first collimate optical system 11 is made incident on the condensing optical system 12. The condensing optical system 12 makes the bundle of rays LB incident on the rod 13 to condense the bundle of rays LB.

The rod 13 includes a light-incident end face 13a and a light-emitting end face 13b. The light-incident end face 13a is disposed in a focus position or near a focal point of the condensing optical system 12.

The bundle of rays LB made incident on the light-incident end face 13a of the rod 13 is propagated on the inside of the rod 13 by being totally reflected and is emitted from the light-emitting end face 13b. Consequently, an in-plane intensity distribution of the bundle of rays LB emitted from the light-emitting end face 13b is uniformized. The bundle of rays LB, the in-plane intensity distribution of which is uniformized by the rod 13, is made incident on the second collimate optical system 14.

The second collimate optical system 14 is formed by one lens. The bundle of rays LB emitted from the rod 13 is made incident on the second collimate optical system 14. The second collimate optical system 14 converts the bundle of rays LB emitted from the rod 13 into parallel lights. The collimated bundle of rays LB is made incident on the lens integrator 15 provided at the post-stage of the second collimate optical system 14.

The lens integrator 15 includes a first lens array 24 and a second lens array 25 provided at a post-stage of the first lens array 24.

The first lens array 24 includes a plurality of first small lenses 24a. The plurality of first small lenses 24a are arrayed in a matrix shape of a plurality of rows and a plurality of columns in a plane orthogonal to the illumination optical axis AX. The first lens array 24 divides the bundle of rays LB emitted from the rod 13 into a plurality of partial beams of light.

The shape of each of the first small lenses 24a is substantially similar to the shape of the image formation region of the liquid-crystal light valve for blue light 102B. Consequently, each of the partial beams of light emitted from the first lens array 24 can be efficiently made incident on the image formation region of the liquid-crystal light valve for blue light 102B. Accordingly, it is possible to realize high light use efficiency.

The second lens array 25 includes a plurality of second small lenses 25a. The shape of each of the plurality of first small lenses 24a is the same as the shape of each of the plurality of second small lenses 25a. The first small lenses 24a and the second small lenses 25a correspond to each other in a one-to-one relation. The plurality of second small lenses 25a are arrayed in a matrix shape of a plurality of rows and a plurality of columns in a plane orthogonal to the illumination optical axis AX.

A plurality of images of the light-emitting end face 13b of the rod 13 are formed on a lens surface of the second lens array 25. The image functions as a secondary light source.

The second lens array 25 has a function of forming images of the first small lenses 24a of the first lens array 24 near the image formation region of the liquid-crystal light valve for blue light 102B in cooperation with the superimposing lens 16 and the field lens 106B at a post-stage.

Incidentally, in the projector 100 in this embodiment, the light beam BL emitted from the laser light source 19 is coherent light. Therefore, speckle noise occurs in a projected image.

The inventor obtained knowledge that, in order to increase the EP value described in JP-A-2015-64444, uniformity of an intensity distribution of secondary light source images formed on the second lens array 25 only has to be increased or a plurality of secondary light source images only have to be widely distributed on the second lens array 25 (a spatial distribution of a plurality of secondary light sources only has to be expanded). Then, the inventor completed the configuration in this embodiment.

Effects by the configuration in this embodiment are explained with reference to a comparative example.

Figure 3:
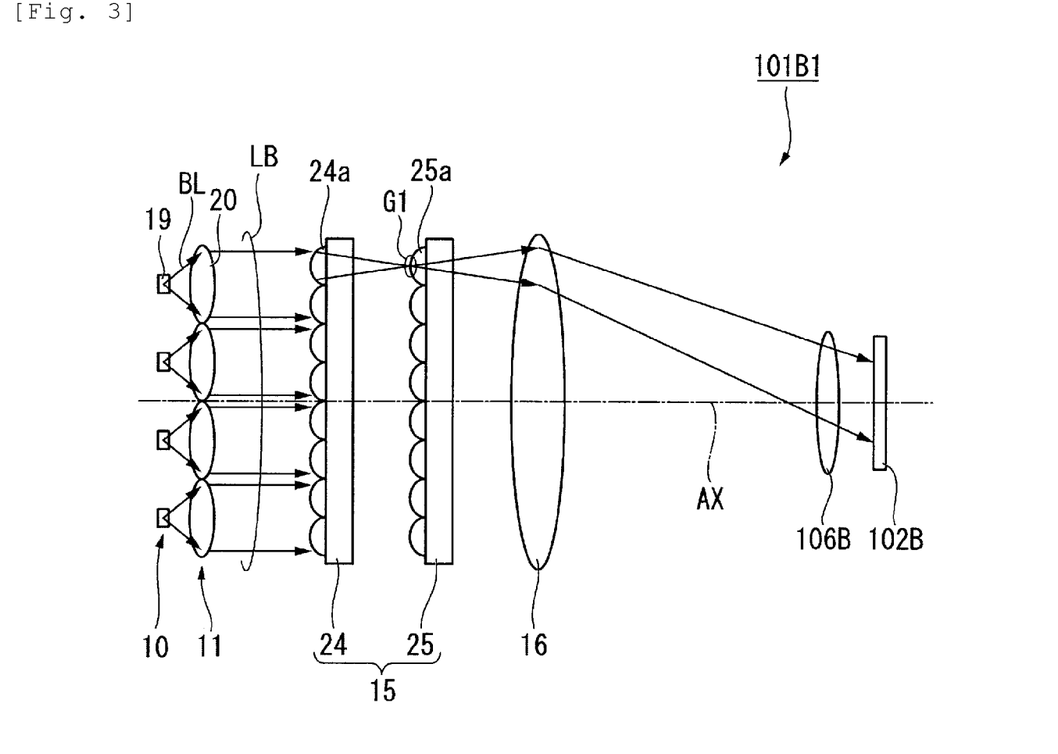
FIG. 3 is a diagram showing a schematic configuration of an illumination device for blue light according to a comparative example.

FIG. 3 is a diagram showing a schematic configuration of an illumination device for blue light 101B1 according to the comparative example. The illumination device for blue light 101B1 is different from the illumination device for blue light 101B in that the illumination device for blue light 101B1 does not include a condensing optical system, a rod, and a second collimate optical system. Note that, in FIG. 3 as well, for convenience of explanation, the field lens 106B and the liquid-crystal light valve for blue light 102B are also illustrated.

As shown in FIG. 3, the illumination device for blue light 101B1 according to the comparative example includes the light source device 10, the first collimate optical system 11, the lens integrator 15, and the superimposing lens 16. Therefore, the bundle of rays LB transmitted through the first collimate optical system 11 is directly made incident on the lens integrator 15.

In the illumination device for blue light 101B1, the laser light sources 19 and the second lens array 25 are in a conjugate relation. Therefore, images (secondary light source images G1) of the laser light sources 19 are formed on the second lens array 25.

Figure 4:
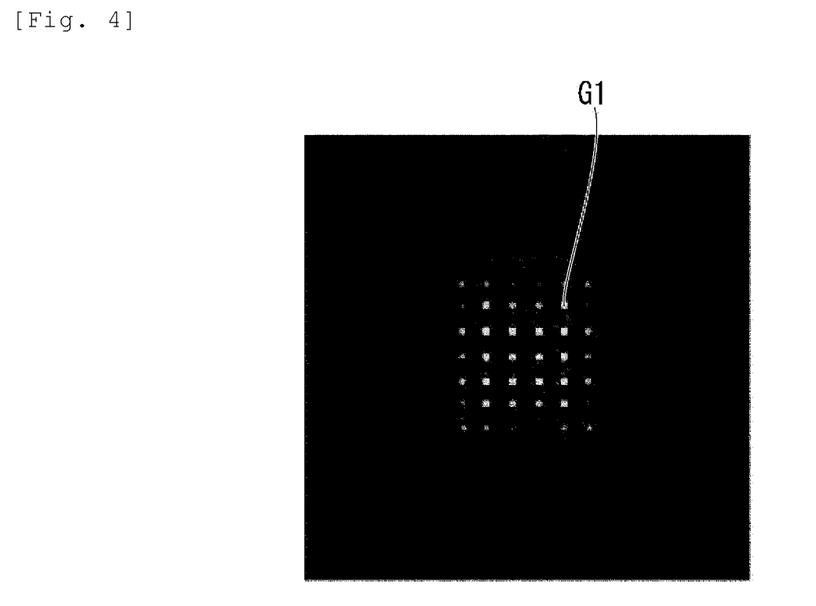
FIG. 4 is a diagram showing secondary light source images formed on a second lens array according to the comparative example.

FIG. 4 is a diagram showing the secondary light source images G1 formed on the lens surface of the second lens array 25 in the comparative example. As shown in FIG. 4, lights from the laser light sources 19 form images on the second lens array 25. Therefore, the size of the secondary light source images G1 is small.

When the size of the secondary light source images G1 is small in this way, the EP value is also small as explained above. Therefore, speckle noise tends to be conspicuous.

On the other hand, the illumination device for blue light 101B according to this embodiment includes the condensing optical system 12, the rod 13, and the second collimate optical system 14. The lens surface of the second lens array 25 (the surfaces of the second small lenses 25a) and the light-emitting end face 13b of the rod 13 are substantially conjugate with each other.

Figure 5:
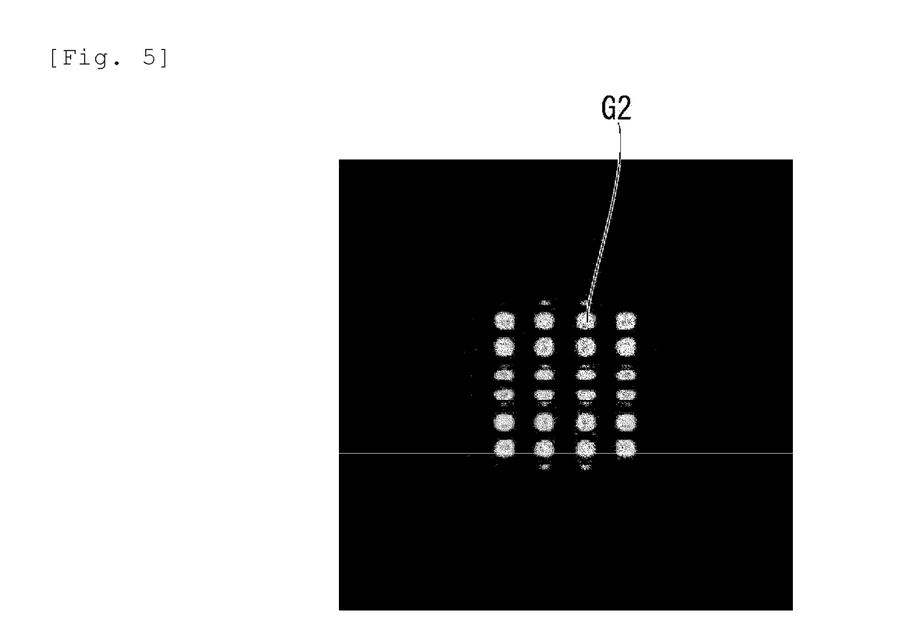
FIG. 5 is a diagram showing secondary light source images formed on a second lens array according to the first embodiment.

FIG. 5 is a diagram showing secondary light source images G2 formed on the lens surface of the second lens array 25 in this embodiment. As shown in FIG. 5, images (the secondary light source images G2) of the light-emitting end face 13b of the rod 13 are formed on the lens surface of the second lens array 25. The secondary light source images G2 in this embodiment are larger than the secondary light source images G1 of the comparative example shown in FIG. 4.

The size of the secondary light source images G2 can be optionally set according to the size of the light-emitting end face 13b of the rod 13.

In this embodiment, the shape of the light-emitting end face 13b of the rod 13 and the shape of each of the plurality of second small lenses 25a of the second lens array 25 are similar. Consequently, it is possible to expand the secondary light source images G2 to a maximum size fit on the inner side of the contour of the second small lens 25a.

According to this embodiment, it is possible to reduce speckles by increasing the size of the secondary light source images G2 formed on the second lens array 25.

Positional deviation (a mounting error) sometimes occurs between the plurality of laser light sources 19 configuring the light source device 10 and the plurality of collimate lenses 20.

In this embodiment, the bundle of rays LB emitted from the light source device 10 is condensed and made incident on the light-incident end face 13a of the rod 13. The size of the light-incident end face 13a of the rod 13 is sufficiently larger than a positional deviation range of a condensing point of the bundle of rays LB due to the mounting error.

Therefore, even when the mounting error occurs in the light source device 10, the bundle of rays LB can be made incident in the light-incident end face 13a (an illuminated object) of the rod 13. Therefore, the light emitted from the light source device 10 can be efficiently used.

In the illumination device for blue light 101B in this embodiment, light use efficiency is less easily affected by the mounting error.

Referring back to FIG. 2, the superimposing lens 16 provided at the post-stage of the lens integrator 15 superimposes a plurality of beams of light emitted from the second lens array 25 one on top of another on the liquid-crystal light valve for blue light 102B, which is an illuminated region, in cooperation with the field lens 106B. Consequently, an intensity distribution of light illuminating the liquid-crystal light valve for blue light 102B is uniformized. Axial symmetry around the illumination optical axis AX is improved.

As explained above, according to this embodiment, the secondary light source images G2 formed on the second lens array 25 can be enlarged. As a result, speckle noise of an image projected by a projector 1 is further reduced than in the past.

Second Embodiment

Subsequently, an illumination device according to a second embodiment is explained. In this embodiment as well, only an illumination device for blue light is explained. Explanation is omitted concerning an illumination device for red light and an illumination device for green light. Note that components and members common to the first embodiment are denoted by the same reference numerals and signs. Explanation of the components and the members is omitted or simplified.

Figure 6:
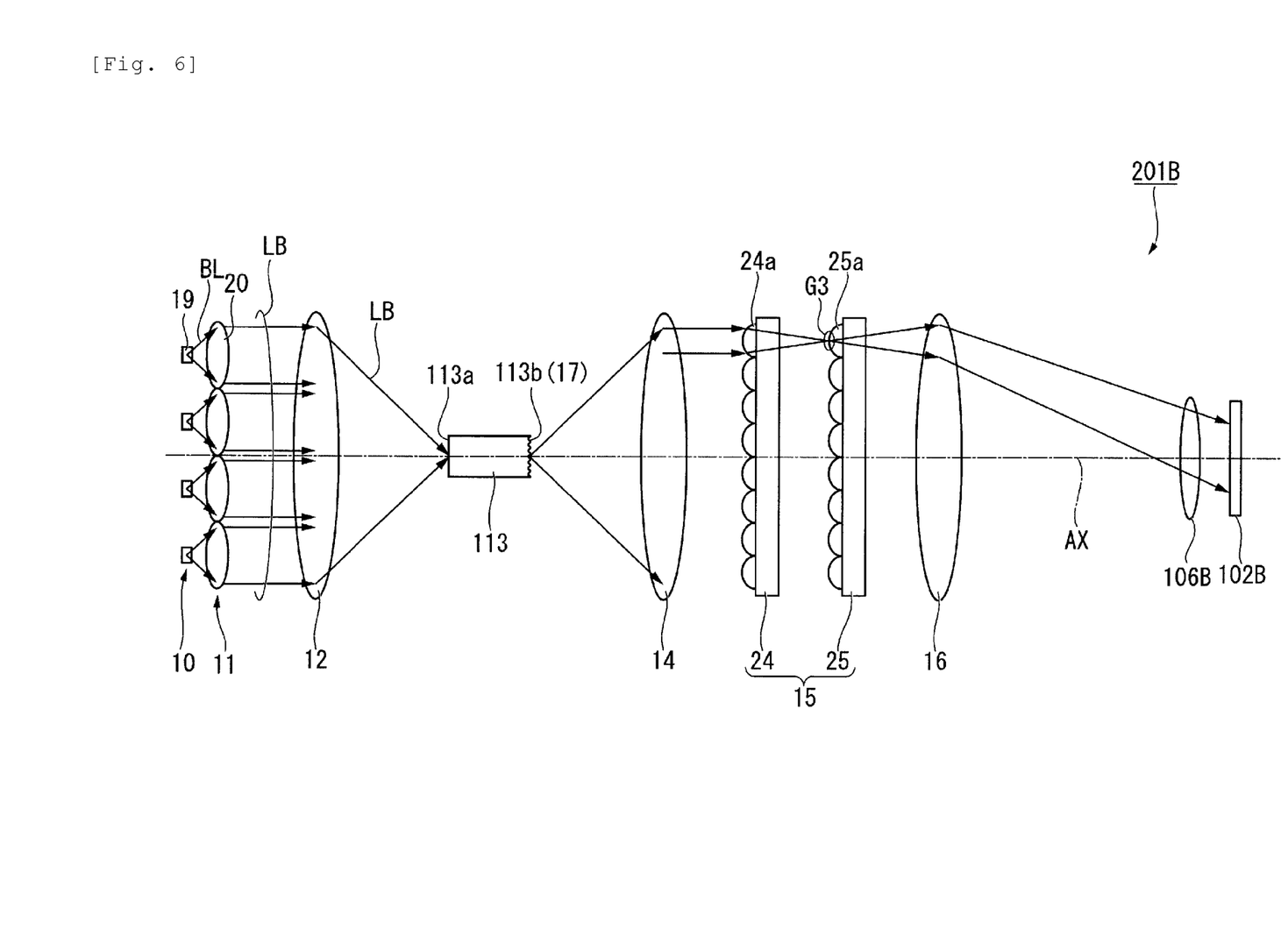
FIG. 6 is a diagram showing a schematic configuration of an illumination device for blue light according to a second embodiment.

FIG. 6 is a diagram showing a schematic configuration of an illumination device for blue light 201B according to this embodiment.

As shown in FIG. 6, the illumination device for blue light 201B includes the light source device 10, the first collimate optical system 11, the condensing optical system 12, a rod 113, the second collimate optical system 14, the lens integrator 15, and the superimposing lens 16.

The rod 113 includes a light-incident end face 113a, a light-emitting end face 113b, and a diffusing section 17. Unlike the illumination device for blue light 201B in the first embodiment, the illumination device for blue light 201B includes the diffusing section 17. The diffusing section 17 is, for example, an uneven structure provided on the surface of the light-emitting end face 113b. The uneven structure is finer than the plurality of first small lenses 24a or second small lenses 25a. The diffusing structure is configured from, for example, micro-lenses directly formed on the surface of the light-emitting end face 113b, unevenness formed by applying blasting to the surface of the light-emitting end face 113b, and diffraction elements formed on the surface of the light-emitting end face 113b.

The diffusing section 17 diffuses, at a predetermined angle, the bundle of rays LB emitted from the light-emitting end face 113b. Since the bundle of rays LB is diffused by the diffusing section 17, compared with when the illumination device for blue light 101B does not include the diffusing section 17, the size of a formation region where a plurality of secondary light source images are formed (a spatial distribution of the plurality of secondary light source images) on the second lens array 25 is large.

Figure 7:
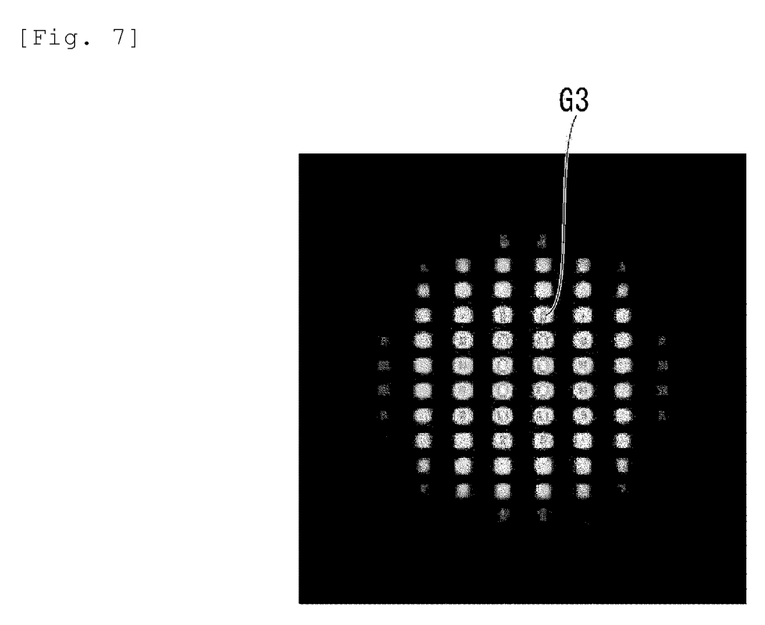
FIG. 7 is a diagram showing secondary light source images formed on a second lens array according to the second embodiment.

FIG. 7 is a diagram showing secondary light source images formed on the lens surface of the second lens array 25 in this embodiment. As shown in FIG. 7, the size of a formation region of a plurality of secondary light source images G3 by the bundle of rays LB diffused by the diffusing section 17 is larger than the size of a formation region of the plurality of secondary light source images G2 in the case in which the bundle of rays LB is not diffused as in the illumination device for blue light 201B in the first embodiment. That is, with the configuration in this embodiment, it is possible to further reduce speckles by further expanding a spatial distribution of the plurality of secondary light source images G3 than in the first embodiment.

Third Embodiment

Subsequently, an illumination device according to a third embodiment is explained. In this embodiment as well, only an illumination device for blue light is explained. Explanation is omitted concerning an illumination device for red light and an illumination device for green light. Note that components and members common to the second embodiment are denoted by the same reference numerals and signs. Explanation of the components and the members is omitted or simplified.

Figure 8:
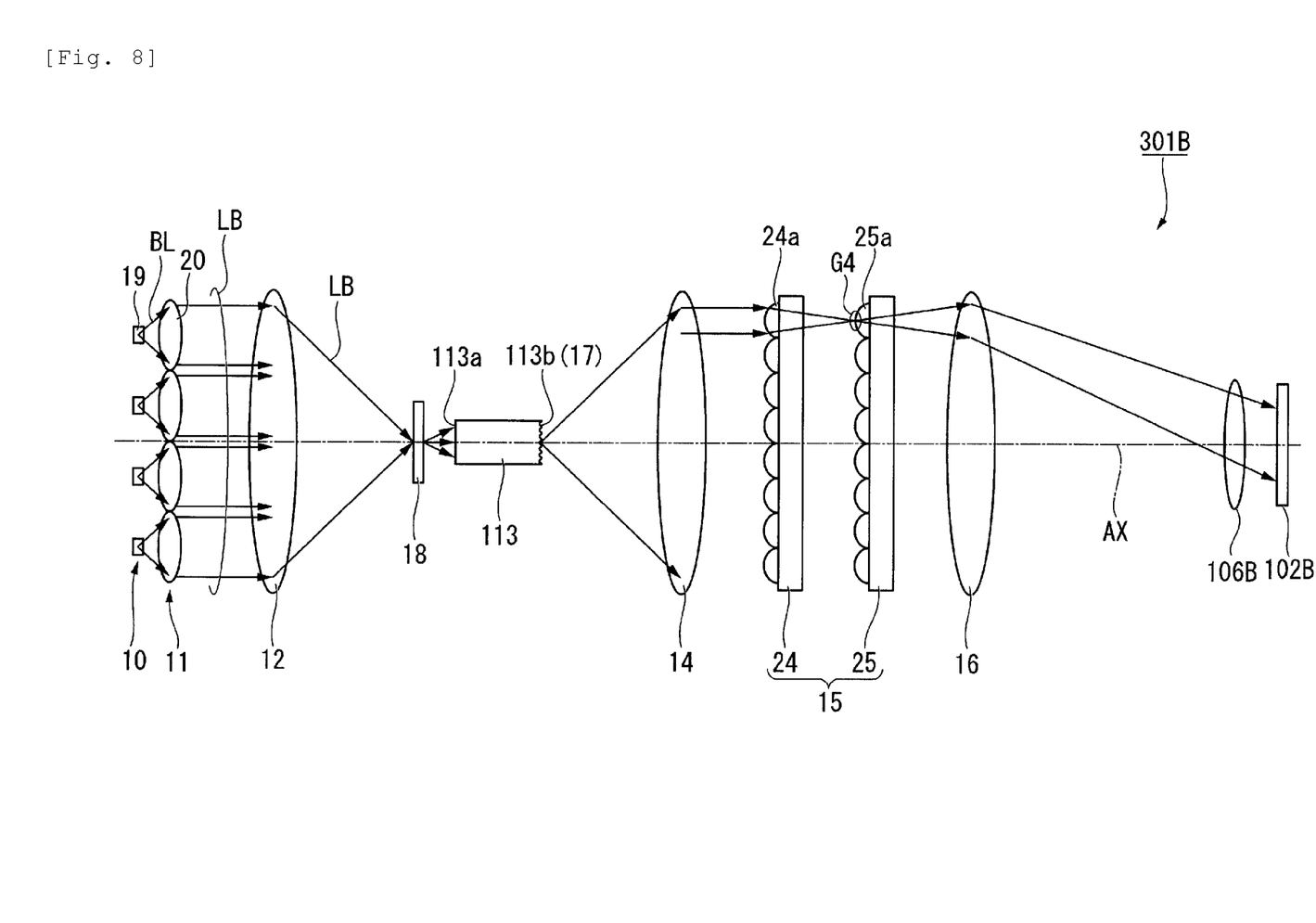
FIG. 8 is a diagram showing a schematic configuration of an illumination device for blue light according to a third embodiment.

FIG. 8 is a diagram showing a schematic configuration of an illumination device for blue light 301B according to this embodiment.

As shown in FIG. 8, the illumination device for blue light 301B includes the light source device 10, the first collimate optical system 11, the condensing optical system 12, a diffusion plate 18, the rod 113, the second collimate optical system 14, the lens integrator 15, and the superimposing lens 16.

That is, the illumination device for blue light 301B in this embodiment is different from the second embodiment in that the illumination device for blue light 301B includes the diffusion plate 18 provided on an optical path of the bundle of rays LB between the condensing optical system 12 and the light-emitting end face 113b. The diffusion plate 18 is equivalent to the "diffusing section" described in the claims.

In this embodiment, the diffusion plate 18 is disposed near the light-incident end face 113a of the rod 113. The diffusion plate 18 is formed by, for example, a substrate having an uneven structure. As the uneven structure, like the uneven structure of the diffusing section 17 explained above, micro-lenses, unevenness formed by applying blasting, diffraction elements, and the like can be illustrated.

The diffusion plate 18 diffuses the bundle of rays LB condensed by the condensing optical system 12 and makes the bundle of rays LB incident on the light-incident end face 113a of the rod 113. Since the bundle of rays LB is made incident on the rod 113 in a diffused state, an in-plane intensity distribution of the bundle of rays LB emitted from the light-emitting end face 113b is more uniformized compared with when the diffusion plate 18 is not used (the configuration in the second embodiment). Accordingly, secondary light source images having an in-plane intensity distribution with higher uniformity are formed on the second lens array 25.

Figure 9:
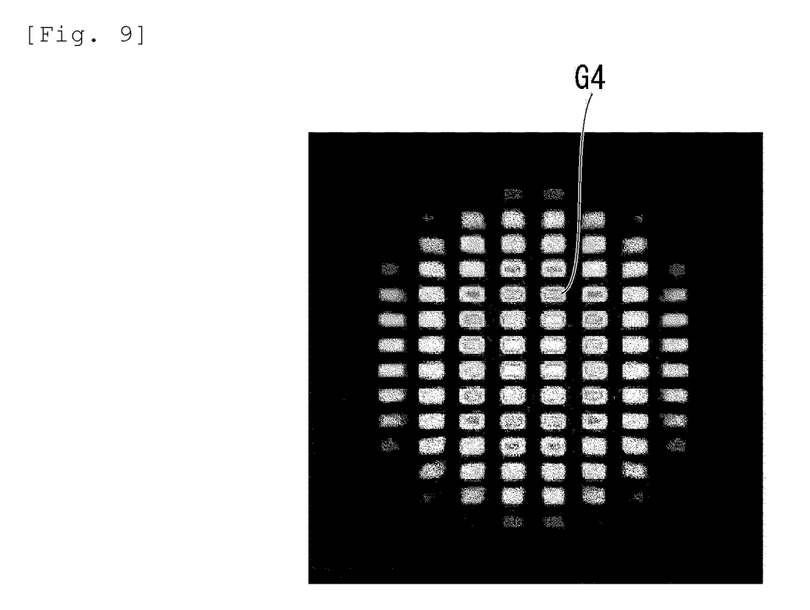
FIG. 9 is a diagram showing secondary light source images formed on a second lens array according to the third embodiment.

FIG. 9 is a diagram showing secondary light source images formed on the lens surface of the second lens array 25 in this embodiment. As shown in FIG. 9, since the bundle of rays LB is diffused by the diffusion plate 18, uniformity of secondary light source images G4 is higher than the uniformity of the secondary light source images G3 in the second embodiment. Accordingly, with the configuration in this embodiment, it is possible to further reduce speckles by further increasing the uniformity of the secondary light source images G4 than in the second embodiment.

Note that the diffusion plate 18 has a function of increasing uniformity of the in-plane intensity distribution of the bundle of rays LB. Therefore, a rod having a relatively low light uniformizing function may be used as the rod 113. For example, a rod in which a lens entire length, which determines the number of times of total reflection of light, is short may be used. Consequently, the illumination device for blue light 301B can be further reduced in size than the illumination device for blue light 101B in the first embodiment. Since the illumination device for blue light 301B includes the diffusion plate 18, the diffusing section 17 may be omitted.

Fourth Embodiment

Subsequently, an illumination device according to the fourth embodiment is explained. In this embodiment as well, only an illumination device for blue light is explained. Explanation is omitted concerning an illumination device for red light and an illumination device for green light. Note that components and members common to the third embodiment are denoted by the same reference numerals and signs. Explanation of the components and the members is omitted or simplified.

Figure 10:
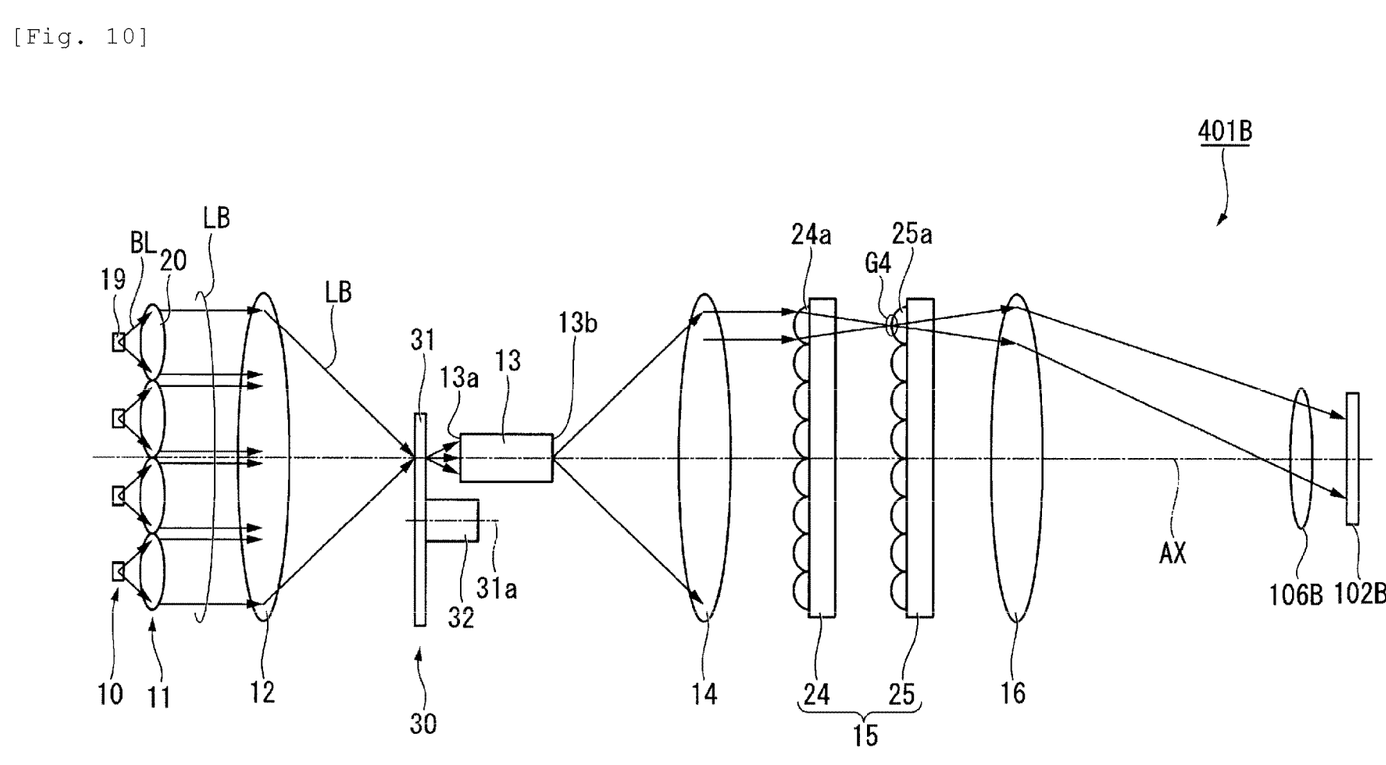
FIG. 10 is a diagram showing a schematic configuration of an illumination device for blue light according to a fourth embodiment.

FIG. 10 is a diagram showing a schematic configuration of an illumination device for blue light 401B according to this embodiment.

As shown in FIG. 10, the illumination device for blue light 401B includes the light source device 10, the first collimate optical system 11, the condensing optical system 12, a rotary diffusion plate 30, the rod 13, the second collimate optical system 14, the lens integrator 15, and the superimposing lens 16.

That is, the illumination device for blue light 401B in this embodiment is different from the first embodiment in that the illumination device for blue light 401B includes the rotary diffusion plate 30 on an optical path of the bundle of rays LB between the condensing optical system 12 and the light-emitting end face 13b. In this embodiment, the rotary diffusion plate 30 is equivalent to the "diffusing section" described in the claims.

In this embodiment, the rotary diffusion plate 30 includes a diffusion plate 31 and a motor 32 that rotates the diffusion plate 31 around a predetermined rotation axis 31a. The diffusion plate 31 has the same configuration as the configuration of the diffusion plate 18. Note that, in this embodiment, the rotation axis 31a is an axis extending in parallel to the illumination optical axis AX. However, the direction of the rotation axis 31a is not particularly limited.

The rotary diffusion plate 30 rotates the diffusion plate 31 around the rotation axis 31a to temporally change a diffusion state of the bundle of rays LB transmitted through the diffusion plate 31. That is, with the configuration in this embodiment, a speckle pattern temporally changes. Since a time-averaged speckle pattern is recognized by an observer, speckle noise is less conspicuous than when the diffusion plate 31 does not rotate.

The rotary diffusion plate 30 can also reduce interference unevenness due to use of a laser light.

Note that remarkable effects can be obtained when the configuration in this embodiment is applied to the illumination device for red light 101R in which speckle noise is most conspicuous. The rod 13 may be replaced with the rod 113 explained in the second embodiment.

The embodiments of the present invention are explained above. However, the present invention is not limited to the contents of the embodiments and can be changed as appropriate in a range not departing from the gist of the invention.

For example, in the second, third, and fourth embodiments, the example is explained in which the diffusing section is provided between the condensing optical system 12 and the light-incident end face 13a of the rod 13 or on the light-emitting end face 13b. However, a position where the diffusing section is provided is not limited to this. That is, the diffusing section may be provided on the light-incident end face 13a or may be provided on the inside of the rod 13 (between the light-incident end face 13a and the light-emitting end face 13b).

In the embodiment, the projector including the three liquid-crystal light valves is illustrated. However, the present invention may be applied to a projector that displays a color video with one liquid-crystal light valve. Further, as the light modulating device, for example, a digital mirror device may be used.

In the embodiments, the example is explained in which the illumination device according to the present invention is applied to the projector. However, the present invention is not limited to this. The illumination device according to the present invention can also be applied to a luminaire such as a headlight for an automobile.

The entire disclosure of Japanese Patent Application No. 2016-172993 filed on Sep. 5, 2016 is expressly incorporated by reference herein.

What is claimed is:

1. An illumination device comprising:
a light source device;
a first collimate optical system on which a light beam emitted from the light source device is made incident;
a condensing optical system provided at a post-stage of the first collimate optical system;
a rod provided at a post-stage of the condensing optical system;
a second collimate optical system provided at a post-stage of the rod;
a lens integrator provided at a post-stage of the second collimate optical system; and
a superimposing lens provided at a post-stage of the lens integrator, wherein
the lens integrator includes a first lens array and a second lens array provided at a post-stage of the first lens array, and
a light-emitting end face of the rod and a lens surface of the second lens array are substantially conjugate with each other.

2. The illumination device according to claim 1, further comprising a diffusing section provided on an optical path of the light beam between the condensing optical system and the light-emitting end face or on the light-emitting end face.

3. The illumination device according to claim 2, wherein the diffusing section is provided between the condensing optical system and a light-incident end face of the rod and configured to be rotatable around a predetermined rotation axis.

4. The illumination device according to claim 1, wherein
the second lens array includes a plurality of second small lenses, and
a shape of each of the plurality of second small lenses is similar to a shape of the light-emitting end face.

5. A projector comprising:
the illumination device according claim 1;
a light modulating device that modulates illumination light from the illumination device according to image information to thereby form image light; and
a projection optical system that projects the image light.

6. The projector according to claim 5, wherein
the first lens array includes a plurality of first small lenses,
the light modulating device includes an image formation region, and
a shape of each of the plurality of first small lenses is similar to a shape of the image formation region.

* * * * *